(12) United States Patent
Williams

(10) Patent No.: US 8,875,351 B1
(45) Date of Patent: Nov. 4, 2014

(54) SHOPPING CART HANDLE SHIELD DEVICE

(71) Applicant: Lewis M. Williams, Red Bluff, CA (US)

(72) Inventor: Lewis M. Williams, Red Bluff, CA (US)

( * ) Notice: Subject to any disclaimer, the term of this patent is extended or adjusted under 35 U.S.C. 154(b) by 0 days.

(21) Appl. No.: 13/950,440

(22) Filed: Jul. 25, 2013

(51) Int. Cl.
*B25G 1/10* (2006.01)
*B62B 5/06* (2006.01)

(52) U.S. Cl.
CPC ........................... *B62B 5/069* (2013.01)
USPC ................................. 16/436; 16/421

(58) Field of Classification Search
CPC .... A61G 2017/041; B62K 21/26; B25G 1/10; B25G 1/102
USPC ........... 16/406, 413, 421, 422, 425, 426, 428, 16/436, DIG. 12
See application file for complete search history.

(56) References Cited

U.S. PATENT DOCUMENTS

| 45,581 | A | * | 12/1864 | Brocksieper .................. 38/95 |
|---|---|---|---|---|
| 1,162,896 | A | * | 12/1915 | Achberger .................. 220/753 |
| 1,246,587 | A | * | 11/1917 | Giardino ...................... 294/169 |
| 2,918,741 | A | * | 12/1959 | Carpenter et al. .............. 40/308 |
| 5,429,377 | A | | 7/1995 | Duer |
| 5,810,372 | A | * | 9/1998 | Arendt ..................... 280/33.992 |
| 6,065,764 | A | | 5/2000 | Moseley |
| 6,543,794 | B1 | | 4/2003 | Tyree |
| 6,817,066 | B1 | | 11/2004 | Williams et al. |
| 6,981,707 | B1 | * | 1/2006 | Dandy ..................... 280/33.992 |
| D521,207 | S | | 5/2006 | Anderson et al. |
| 2002/0092132 | A1 | * | 7/2002 | Kessler .......................... 16/436 |
| 2003/0196299 | A1 | * | 10/2003 | Trottier .......................... 16/421 |
| 2009/0133789 | A1 | | 5/2009 | Hall |

* cited by examiner

*Primary Examiner* — Roberta Delisle

(57) ABSTRACT

A shopping cart handle shield device provides a temporary shield preventing contact with the handle of a shopping cart. The device includes a slot extending through a first tube between a first end and a second end of the first tube defining a gap between opposite sides of the slot. Thus, the first tube is coupled to the tubular handle of the shopping cart by inserting the handle of the shopping cart through the slot. A slit extends through a second tube between a first end of the second tube and a second end of the second tube defining a gap between opposite sides of the slit. Thus, the second tube is coupled to the handle by inserting the handle through the slit. A tether has a first end coupled to the first tube and a second end coupled to the second tube.

8 Claims, 3 Drawing Sheets

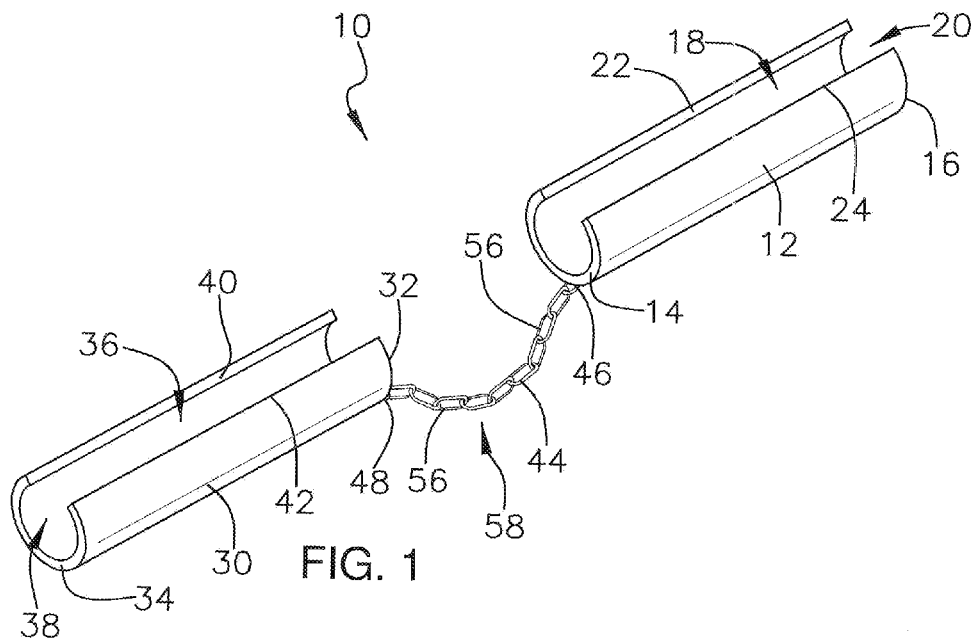
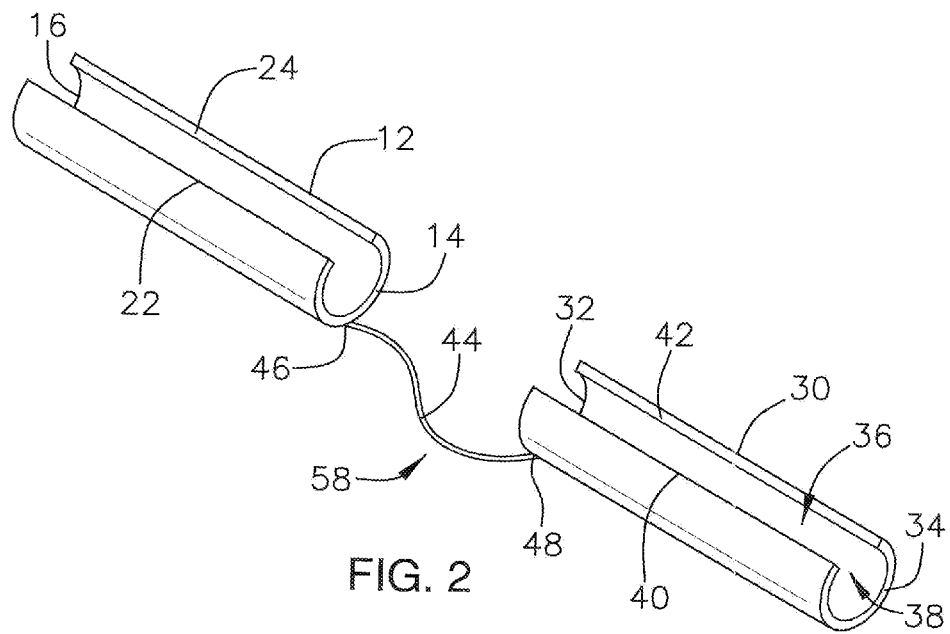

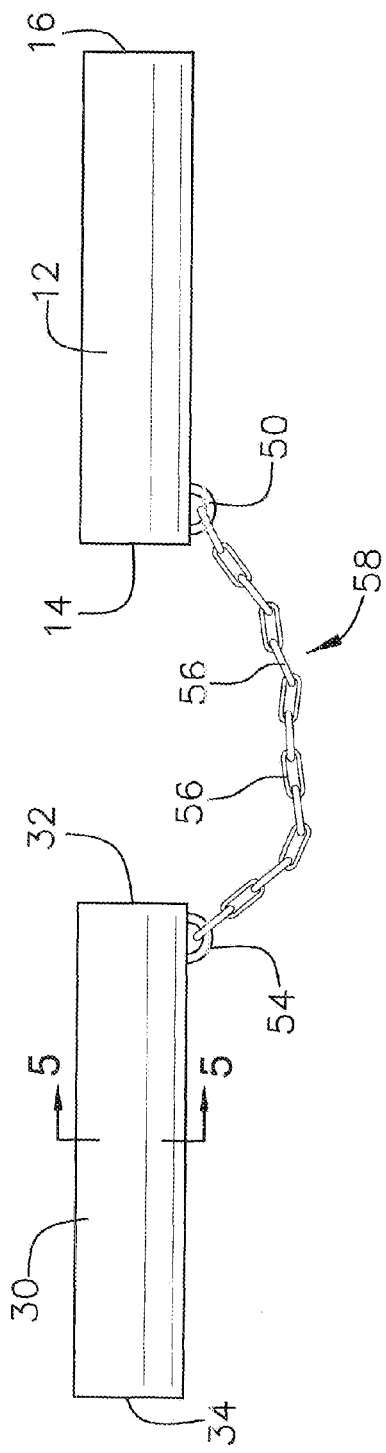
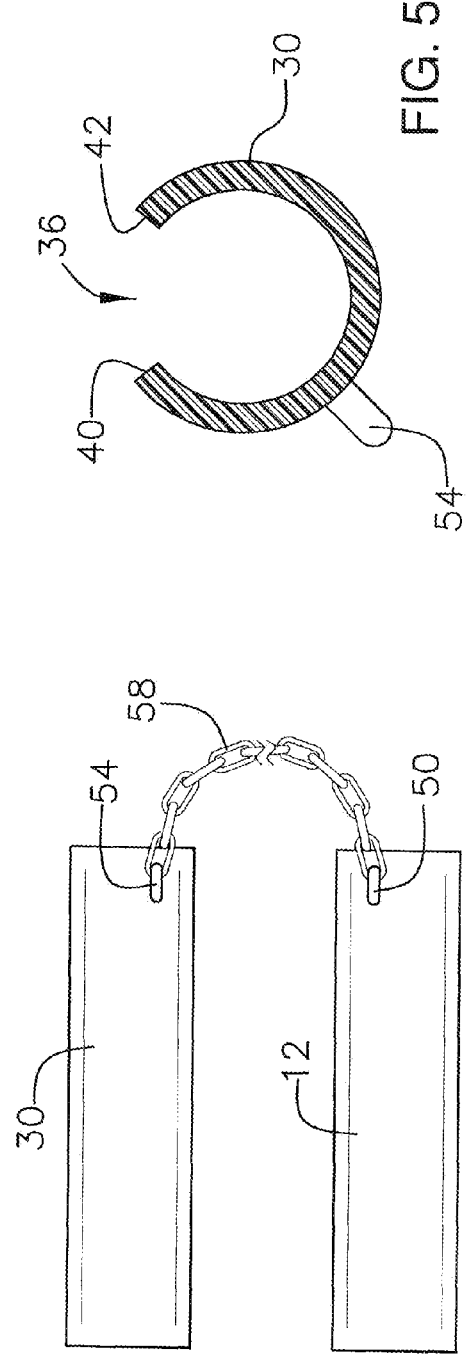

SHOPPING CART HANDLE SHIELD DEVICE

BACKGROUND OF THE DISCLOSURE

Field of the Disclosure

The disclosure relates to shield devices and more particularly pertains to a new shield device for providing a temporary shield to prevent contact with handles on public shopping carts.

SUMMARY OF THE DISCLOSURE

An embodiment of the disclosure meets the needs presented above by generally comprising a first tube having a first end and a second end. A slot extends through the first tube extending between the first end and the second end of the first tube defining a gap between opposite sides of the slot. Thus, the first tube is coupled to the tubular handle of the shopping cart by inserting the handle of the shopping cart through the slot. A slit extends through a second tube between a first end of the second tube and a second end of the second tube defining a gap between opposite sides of the slit. Thus, the second tube is coupled to the handle by inserting the handle through the slit. A tether has a first end coupled to the first tube and a second end coupled to the second tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a bottom front side perspective view of a shopping cart handle shield device according to an embodiment of the disclosure.

FIG. 2 is a bottom back side perspective view of an embodiment of the disclosure.

FIG. 3 is a front view of an embodiment of the disclosure.

FIG. 4 is a bottom view of an embodiment of the disclosure.

FIG. 5 is a cross-sectional view of an embodiment of the disclosure taken along line 5-5 of FIG. 3.

DESCRIPTION OF THE PREFERRED EMBODIMENT

Figure 6:
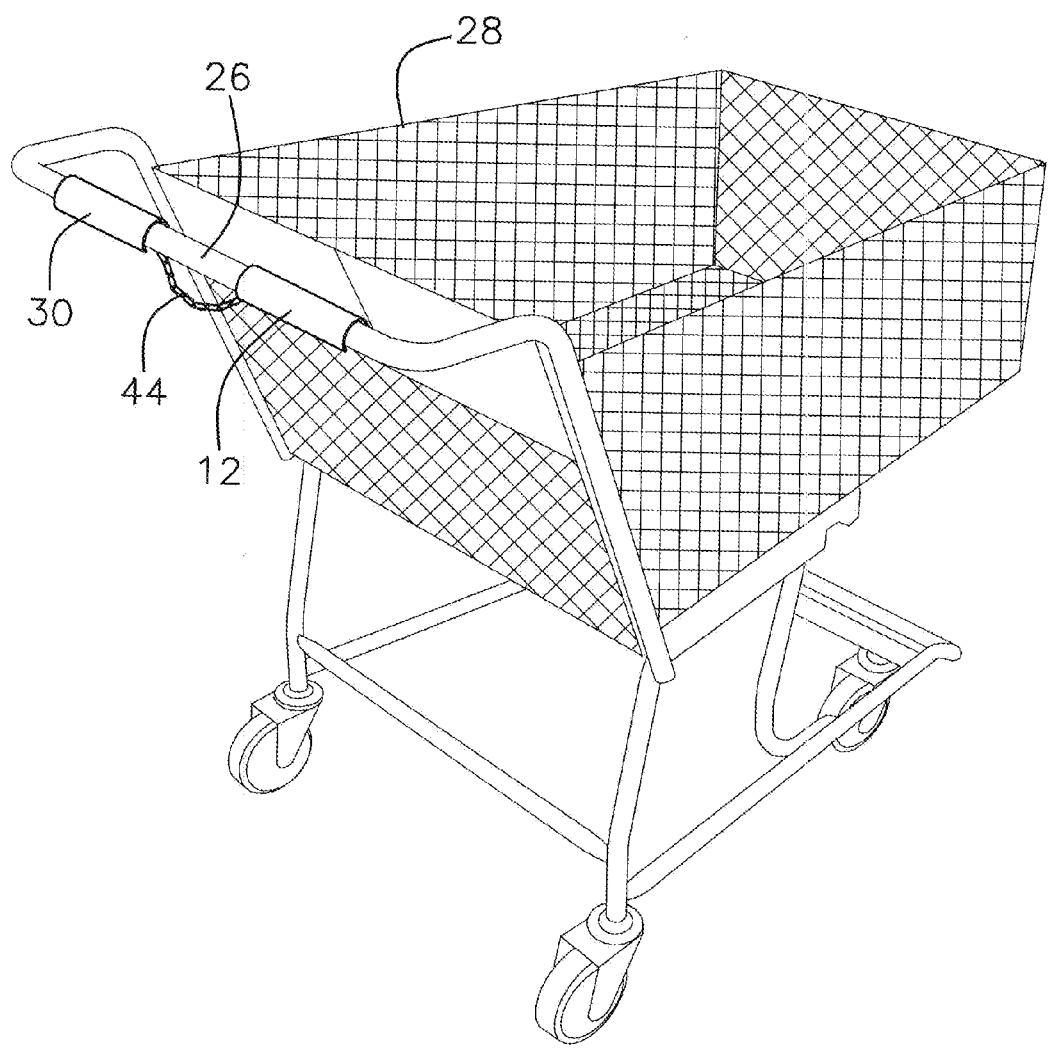
FIG. 6 is a top front side perspective view of an embodiment of the disclosure in use.

With reference now to the drawings, and in particular to FIGS. 1 through 6 thereof, a new shield device embodying the principles and concepts of an embodiment of the disclosure and generally designated by the reference numeral 10 will be described.

As best illustrated in FIGS. 1 through 6, the shopping cart handle shield device 10 generally comprises a first tube 12 having a first end 14 and a second end 16. A slot 18 extends through the first tube 12. The slot 18 extends a full length between the first end 14 of the first tube 12 and the second end 16 of the first tube 12 defining a gap 20 between opposite sides 22,24 of the slot 18. Thus, the first tube 12 is configured for coupling to a tubular handle 26 of a shopping cart 28 by inserting the handle 26 of the shopping cart 28 through the slot 18. Similarly, a second tube 30 has a first end 32 and a second end 34. A slit 36 extends through the second tube 30. The slit 36 extends between the first end 32 of the second tube 30 and the second end 34 of the second tube 30 defining a gap 38 between opposite sides 40,42 of the slit 36. Thus, the second tube 30 is also configured for coupling to the tubular handle 26 of the shopping cart 28 by inserting the handle 26 of the shopping cart 28 through the slit 36.

A tether 44 has a first end 46 coupled to the first tube 12 and a second end 48 coupled to the second tube 30. The first end 46 of the tether 44 may be coupled to the first tube 12 proximate the first end 14 of the first tube 12. The second end 48 of the tether 44 may be coupled to the second tube 30 proximate the first end 32 of the second tube 30. A first loop 50 may be coupled to and extend from the first tube 12. The first end 46 of the tether 44 is coupled to and extends from the first loop 50. A second loop 54 may be coupled to and extend from the second tube 30. The second end 48 of the tether 44 is coupled to and extends from the second loop 54.

The tether 44 may be a plurality of interconnected links 56 defining a chain 58 extending between the first tube 12 and the second tube 30 as shown in FIGS. 1, 3 and 4. Alternatively, the tether 44 may be a line 60 extending between the first tube 12 and the second tube 30 as shown in FIG. 2.

In use, the first tube 12 and the second tube 30 may be carried in a purse, pocket, or the like until ready for use. The tether 44 prevents separation of the first tube 12 from the second tube 30. The first tube 12 is installed on the handle 26 of the shopping cart 28 in a desired position prior to grasping the handle 46. The second tube 30 is similarly attached to the handle 26 with the tether 44 extending between the first tube 12 and the second tube 30. The first tube 12 and the second tube 30 each cover a substantial portion of the handle 26 permitting manipulation of the shopping cart 28 while grasping the handle 26 touching only the first tube 12 and the second tube 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A shopping cart handle shield device for covering a tubular handle of a public shopping cart, the device comprising:

a first tube having a first end and a second end;

a slot extending through said first tube, said slot extending between said first end of said first tube and said second end of said first tube defining a gap between opposite sides of said slot wherein said first tube is configured for coupling to the tubular handle of the shopping cart by inserting the handle of the shopping cart through said slot;

a second tube having a first end and a second end;

a slit extending through said second tube, said slit extending between said first end of said second tube and said second end of said second tube defining a gap between opposite side of said slit wherein said second tube is configured for coupling to the tubular handle of the shopping cart by inserting the handle of the shopping cart through said slit; and a tether having a first end coupled to said first tube and a second end coupled to said second tube, said first end of said first tube being positioned adjacent to said first end of said second tube and said first and second tubes being positionable in lateral alignment with each other such that a line may be extended through said first and second ends of both of said first and second tubes, wherein said first ends are positioned between said second ends and said first and second tubes laterally disposed with respect to each other when said first and second tubes are positioned on the handle.

2. The device of claim 1, further comprising said tether being a plurality of interconnected links defining a chain extending between said first tube and said second tube.

3. The device of claim 2, further comprising said tether being a line extending between said first tube and said second tube.

4. The device of claim 1, further comprising said first end of said tether being coupled to said first tube proximate said first end of said first tube, said second end of said tether being coupled to said second tube proximate said first end of said second tube.

5. The device of claim 4, further comprising:

a first loop coupled to and extending from said first tube, said first end of said tether being coupled to and extending from said first loop; and a second loop coupled to and extending from said second tube, said second end of said tether being coupled to and extending from said second loop.

6. A shopping cart handle shield device for covering a tubular handle of a public shopping cart, the device comprising:

a first tube having a first end and a second end;

a slot extending through said first tube, said slot extending between said first end of said first tube and said second end of said first tube defining a gap between opposite sides of said slot wherein said first tube is configured for coupling to the tubular handle of the shopping cart by inserting the handle of the shopping cart through said slot;

a second tube having a first end and a second end;

a slit extending through said second tube, said slit extending between said first end of said second tube and said second end of said second tube defining a gap between opposite side of said slit wherein said second tube is configured for coupling to the tubular handle of the shopping cart by inserting the handle of the shopping cart through said slit;

a tether having a first end coupled to said first tube and a second end coupled to said second tube, said first end of said tether being coupled to said first tube proximate said first end of said first tube, said second end of said tether being coupled to said second tube proximate said first end of said second tube;

a first loop coupled to and extending from said first tube, said first end of said tether being coupled to and extending from said first loop; and a second loop coupled to and extending from said second tube, said second end of said tether being coupled to and extending from said second loop.

7. The device of claim 6, further comprising said tether being a plurality of interconnected links defining a chain extending between said first tube and said second tube.

8. The device of claim 6, further comprising said tether being a line extending between said first tube and said second tube.

* * * * *